UNITED STATES PATENT OFFICE 2,535,993

PROCESS OF PREPARING TRINUCLEAR CYANINE DYES

Thomas R. Thompson, Binghamton, N. Y., assignor to General Aniline & Film Corporation, New York, N. Y., a corporation of Delaware No Drawing. Application December 21, 1948, Serial No. 66,573

4 Claims. (Cl. 260—240.1)

This invention relates to trinuclear cyanine dyes and particularly to an improved method of preparing the same.

Trinuclear cyanine dyes have been prepared by the method described in United States Patent 2,388,963. The method consists of first quaternizing a cyclammonium base, containing a reactive thiol group, and condensing it with a 3-ethyl rhodanine to obtain the merocyanine intermediate. This procedure involves two steps and requires about 4 hours' time. The merocyanine intermediate is then fused with a mixture of a cyclammonium base and a quaternizing agent, such as methyl p-toluenesulfonate for 2½ to 3½ hours. After cooling the melt, pyridine is added and the mixture reheated, under reflux, for 20 to 30 minutes. The reaction mixture is then poured into an aqueous solution of potassium bromide and the final dye obtained by recrystallization from alcohol. The minimum time required for the latter two steps is approximately from 3 to 4 hours, exclusive of the time required to cool the reaction mixture.

Theoretically, the trinuclear dyes should be capable of production by treating 3-alkylrhodanine with an alkyl salt to effect quaternization of the hetero nitrogen atom thereof, and conversion of the thioketo group to a thioether group, the reaction of the thioether group with the reactive grouping of a cyclammonium salt and the linking of the intermediate so formed to a cyanine dye intermediate through the reactive methylene group of the thiazolone ring. In other words, it would seem that said dyes would form by carrying out, with the 3-alkylrhodanine per se, the last step of the conventional process and using the thus formed intermediate for reaction with another mol of a cyanine dye intermediate. Very surprisingly, however, it has been ascertained that 2-alkylthio-3-alkylrhodanines do not react with a cyclammonium salt to yield thiazolone cyanine dye intermediates.

Because of this, the art has become firmly convinced that in order to prepare trinuclear cyanine dyes of the rhodacarbocyanine type, it is necessary to treat a preformed merocyanine dye with an alkyl salt to simultaneously effect quaternization of the nitrogen atom of the rhodanine ring system and the conversion of the thioketo group to a thioether group, and to react the resulting salt with a cyclammonium quaternary salt of the type used in the formation of cyanine dyes. The process steps involved in this preparation are not only tedious but time consuming.

It is an object of the present invention to provide an improved and simplified method for the preparation of trinuclear cyanine dyes.

A further object of the present invention is a method of producing rhodacarbocyanine dyes without first forming the usual merocyanine dye intermediates.

A still further object is to provide a simpler method whereby trinuclear cyanine dyes in excellent yield are obtained.

Other objects and advantages will become apparent from the following description.

I have found that trinuclear cyanine dyes are prepared in excellent yield and in readily purifiable form by treating a cyclammonium quaternary salt, containing a reactive methyl group in $\alpha$-position to the nitrogen atom thereof, of the type commonly employed in cyanine dye synthesis with a thiazolone cyanine dye salt intermediate in the presence or absence of a suitable solvent, such as an aliphatic alcohol, e. g., methyl, ethyl, n-propyl, isopropyl and the like, and in the presence of a basic condensing agent such as trimethylamine, triethylamine, pyridine, methylpyridine, ethylpyridine, quinoline, potassium carbonate and the like, at room temperature for about 1 hour or by heating the reaction mixture for a matter of from 5 to 20 minutes.

The dyes obtained by the foregoing procedure are characterized by the following general formula:

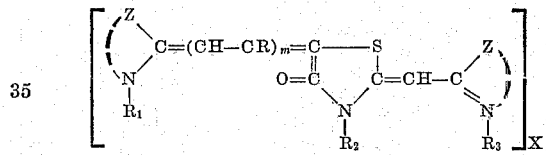

wherein R represents hydrogen or an alkyl group, e. g., methyl, ethyl, propyl or butyl group, R being only alkyl when $m$ represents 1, $R_1$ and $R_3$ are the same or different and represent an aliphatic, aryl, or aralkyl radical or substituted groups of this type, e. g., methyl, ethyl, propyl, butyl, hydroxyethyl, ethoxyethyl, phenyl, naphthyl, tolyl, benzyl, menaphthyl and the like, $R_2$ represents an alkyl, allyl, aryl, or aralkyl group, e. g., methyl, ethyl, propyl, phenyl, naphthyl, tolyl, benzyl, phenethyl, and the like, $m$ represents a positive integer of from 1 to 3, X represents an acid radical, e. g., chloride, bromide, iodide, or alkyl sulfate, alkyl p-toluenesulfonate or perchlorate, and Z is the same or different and represents the residues of heterocyclic nitrogenous nuclei of the type used in cyanine dyes, e. g., oxazoles, thiazoles, selenazoles, and their polycyclic homologues such as those of the benzene, naphthalene, acenaphthene, and anthracene series, pyridine and its polycyclic homologues, such as quinoline and α- and β-naphthaquinolines, peri-naphthiazoles, indolenines, diazines, such as pyrimidines and quinazolines, diazoles (e. g., thio-β-β'-diazole), oxazolines, pyrrolines, thiazolines, and selenazolines (the polycyclic compounds of these series being substituted if desired in the carbocyclic rings with one or more conventional groups, such as alkyl or aryl, as below, amino, hydroxy, alkoxy, i. e., methoxy, ethoxy, etc., and methylene-dioxy groups, or by halogen atoms, i. e., chlorine, bromine, etc.).

The cyclammonium quaternary salts of the type commonly employed in cyanine dye synthesis, containing a reactive methyl group, and treated with the thiazolone cyanine dye intermediate, are characterized by the following general formula:

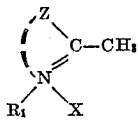

wherein $R_1$, X and Z have the same values as above.

As typical examples of cyclammonium quaternary salts characterized by the foregoing formula and useful in the present invention, the following may be mentioned as being illustrative:

2-methylbenzothiazole ethiodide
2-methylbenzoxazole ethiodide
2-methyl-5,6-methylenedioxybenzothiazole ethiodide
2-methylperinaphthiazole methiodide
2-methyl-$\Delta_1$-pyrroline methiodide, and the like.

The thiazolone cyanine dye intermediates, utilized as the coreactant with the foregoing cyclammonium quaternary salts, are characterized by the following general formulae:

(a) 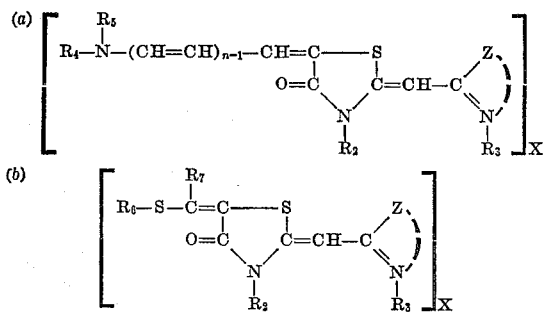

(b)

and (c) 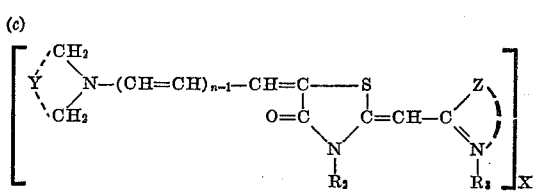

wherein R, $R_2$, $R_3$, X, and Z have the same values as above, $R_4$ represents an aryl group of the benzene and naphthalene series such as phenyl, chlorophenyl, diphenyl or naphthyl, $R_5$ represents either hydrogen or an acetyl group, $R_6$ represents an alkyl or aralkyl group, e. g., methyl, ethyl, propyl, isopropyl, benzyl, β-phenethyl, and the like, $R_7$ represents an alkyl group, e. g., methyl, ethyl, propyl, isopropyl, butyl, isobutyl, etc., and $n$ represents a positive integer of from 1 to 3, and Y represents the atoms necessary to complete a saturated heterocyclic nitrogenous nucleus, such as, for example, piperidine, β- and γ-pipecoline, pyrrolidine, morpholine, tetrahydroquinoline, and the like.

The dyestuff intermediates illustrated by Formulae $a$ and $c$ are prepared according to the method described in my copending application Serial No. 66,571, filed on December 21, 1948, and the intermediates illustrated by the second Formula $b$ are prepared according to the method described in my copending application Serial No. 66,572, filed on December 21, 1948.

The dyestuff intermediates illustrated by Formula $a$ are, in general, obtained by treating a diarylformamidine or its vinylog such as β-anilinoacrolein anil hydrochloride or glutaconic aldehyde dianil hydrochloride, in the presence of an acid condensing agent, such as acetic anhydride, or in the presence of a basic condensing agent, such as triethylamine and the like, with a thiazolone cyanine dye.

The dyestuff intermediates illustrated by Formula $b$ are obtained by treating a thiazolone cyanine dye with an aliphatic acid anhydride in the presence of a mixture of pyridine and triethylamine followed by treatment with phosphorus pentasulfide to yield the thio derivative which is subsequently alkylated with an alkylating agent in the usual way to yield the thioether derivative.

The dyestuff intermediates illustrated by Formula $c$ are prepared by heating the coreactants in the presence of a saturated heterocyclic nitrogenous compound, such as piperidine, morpholine, tetrahydroquinoline, and the like.

The thiazolone cyanine dyes utilized in preparing the foregoing intermediates are characterized by the following general formula:

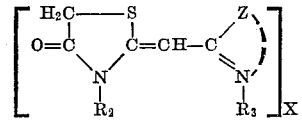

wherein $R_2$, $R_3$, X, and Z have the same values as above, and are prepared according to the method described in my copending application Serial No. 786,814, filed November 18, 1947. In general, the method consists of condensing a substituted thioamide with an α-halogen acetic acid. The compounds, in view of their ketomethylene configuration undergo keto-enol tautomerism, i. e., the keto group enolizes to form a hydroxyl group.

The following examples described the preparation of some of the thiazolone cyanine dye intermediates illustrated by Formulae $a$ to $c$ which are utilized in the preparation of the trinuclear cyanine dyes.

*Example I*

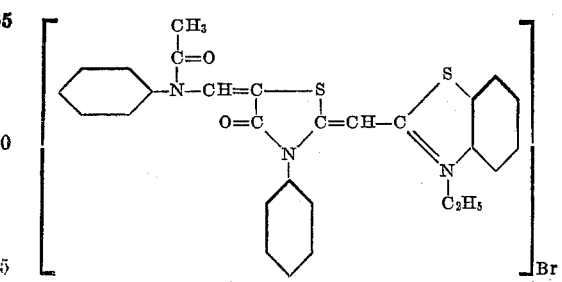

A mixture of 5 grams of diphenylformamidine, 5 grams of the thiazolone cyanine dye of the following structure:

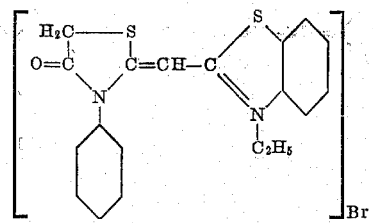

and 15 cc. of acetic anhydride was heated at 140° C. for 30 minutes. After cooling, the product was precipitated with ether and purified by dissolving in a small amount of methanol followed by precipitation with ether. A yield of 5.9 grams of yellow-green crystals, having a melting point at 213–215° C., was obtained.

*Example II*

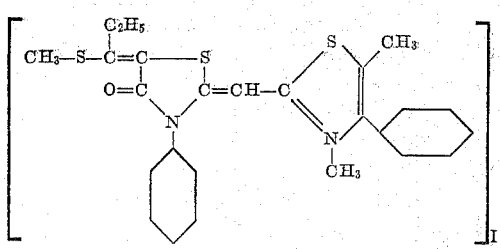

A mixture of 75 cc. of pyridine, 15 cc. of propionic anhydride, 15 cc. of triethylamine, and 15 grams of the thiazolone cyanine dye of the following structure:

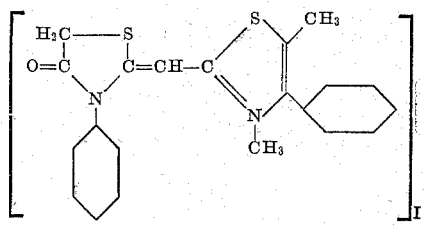

was heated at 120° C. for 30 minutes. Fifteen grams of phosphorus pentasulfide were added in portions and the reaction mixture stirred at 120° C. for 30 minutes. The product was isolated by pouring the reaction mixture into 300 cc. of water. The product was purified by washing with water and subsequent grinding with acetone. A yield of 10.9 grams of yellow glistening crystals melting at 255–260° C. was obtained. The product was fused with 10 cc. of methyl sulfate at 95° C. for 10 minutes to yield a thick yellow solution which upon treatment with an acetone solution of sodium iodide deposits yellow crystals.

*Example III*

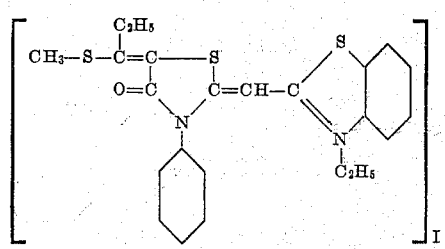

A mixture of 75 cc. of pyridine, 10 cc. of propionic anhydride, 10 cc. of triethylamine, and 13 grams of the thiazolone cyanine dye of the following structure:

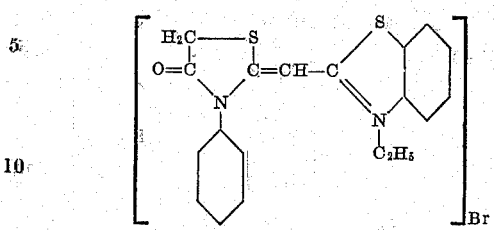

was heated with stirring at 120° C. for 20 minutes. During the course of 10 minutes, a total of 10 grams of phosphorus pentasulfide was added in portions at 120° C. After an additional 10 minutes stirring at 120° C., the mixture was poured into cold water and stirred until the first formed oil solidified. The crude product was stirred with 300 cc. of a 1% aqueous solution of sodium hydroxide and purified by boiling out with isopropanol. There was obtained 10.2 grams of yellow powder which decomposes at about 200° C.

A mixture of 9.3 grams of the yellow powder and 10 grams of methyl p-toluenesulfonate was fused at 95° C. for 1 hour. After cooling, the product was washed with ether and dissolved in 10 cc. of warm acetone. The final product was precipitated as the iodide by adding 25 cc. of methanol containing 20% sodium iodide. The product was washed with water and purified by boiling out with isopropanol. A yield of 4.3 grams of a product melting at 225–228° C. was obtained.

*Example IV*

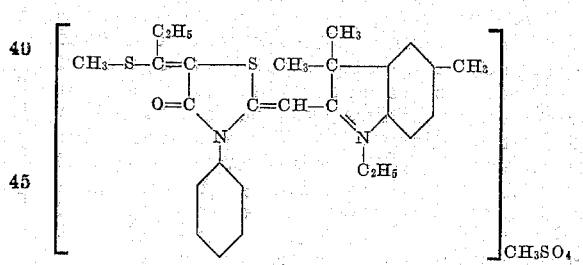

A mixture of 15 cc. of pyridine, 2 cc. of propionic anhydride, 2 cc. of triethylamine, and 2 grams of the thiazolone cyanine dye of the following structure:

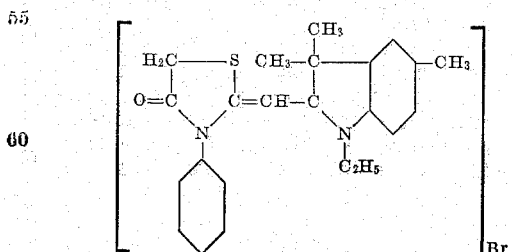

was heated at 120° C. for 3 minutes. There were then added 2 grams of phosphorus pentasulfide and the mixture heated at 115° C. for 15 minutes. A dark red oil was precipitated by the addition of 100 cc. of water and washed with water by decantation. The product was fused with 3 cc. of methyl sulfate at 95° C. for 10 minutes to yield 4.5 grams of a yellow-orange solution which may be employed in dye syntheses.

Example V

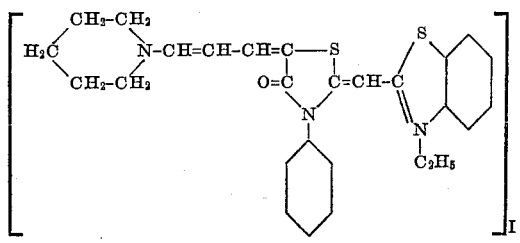

A mixture of 0.5 gram of the product of Example III, 0.3 gram of β-anilinoacrolein anil hydrochloride, 10 cc. of methanol, and 0.5 gram of piperidine was heated at reflux for 5 minutes. The reaction mixture was poured into 60 cc. of water containing 1 gram of potassium iodide. The crystals were separated and purified by boiling out with isopropyl alcohol. A yield of 0.4 gram of a product having a melting point of 270–271° C. was obtained. A methanol solution of the compound has an absorption maximum at 540 m$\mu$.

Example VI

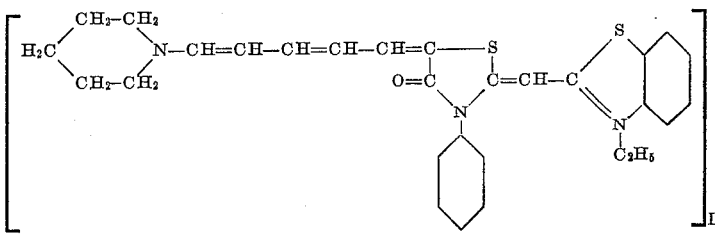

A mixture of 2.85 grams of glutaconaldehyde dianil hydrochloride, 4.3 grams of the compound of Example III, 1 cc. of piperidine and 50 cc. of methanol was heated at reflux for 30 minutes. The reaction mixture was poured into 300 cc. of water containing 5 grams of potassium iodide. The precipitated product was filtered and boiled out with isopropyl alcohol. A yield of 3.7 grams of a compound having a melting point of 195–198° C. was obtained. A methanol solution of the product has an absorption maximum at 624 m$\mu$.

The anions of the foregoing thiazolone cyanine dye salts may be replaced by iodide, thiocyanate or perchlorate ions by treating an alcohol solution of the dye salt with an aqueous or alcohol solution containing a sodium or potassium salt of the desired anion.

The following examples describe in detail improved and simplified method of preparing trinuclear cyanine dyes from the foregoing thiazolone cyanine dyes, but it is to be understood that they are given merely for the purpose of illustration and are not to be construed as limitative.

Example VII

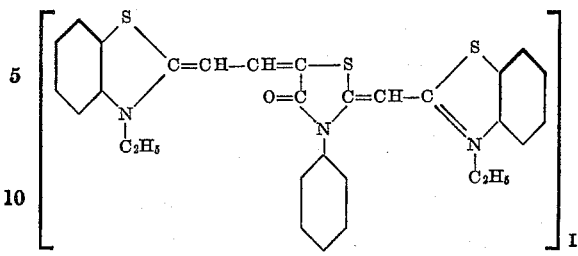

A mixture of 0.46 gram of 2-methylbenzothiazole ethiodide, 0.87 gram of the intermediate of Example I, 50 cc. of methanol, and 0.5 cc. of triethylamine was heated at reflux for 5 minutes. The dye crystals were separated and purified by boiling out with methanol. A yield of 0.69 gram of a product melting at 267–269° C. was obtained. The absorption maximum of a methanol solution of the dye is 595 m$\mu$. When incorporated into a silverhalide emulsion the sensitivity is extended to 710 m$\mu$ with a maximum at 650 m$\mu$.

Example VIII

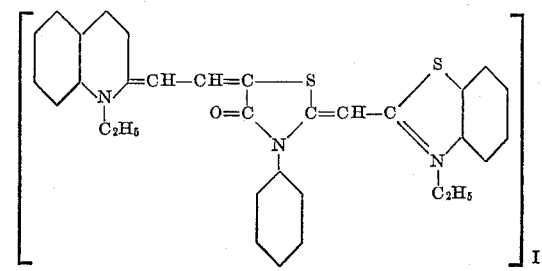

A mixture of 0.6 gram of quinaldine ethiodide, 1.48 grams of the intermediate of Example I, 50 cc. of methanol, and 0.5 cc. of triethylamine was heated at reflux for 5 minutes. After cooling, the fluffy dyestuff was removed and purified by boiling out with methanol. A yield of 0.39 gram of a product melting at 237–240° C. was obtained. The absorption maximum of a methanol solution of the dye is 622 m$\mu$. When incorporated into a photographic emulsion the sensitivity is extended to 720 m$\mu$ with a maximum at 690 m$\mu$.

Example IX

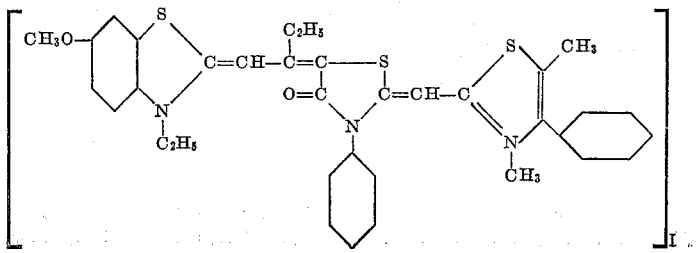

A mixture of 5.8 grams of the intermediate of Example II and 5 grams of methyl p-toluenesulfonate was fused at 95° C. for 30 minutes. There was then added 3.5 grams of 2-methyl-6-methoxybenzothiazole ethiodide, 50 cc. of methanol, and 5 cc. of triethylamine. The resulting mixture was warmed on the steam bath until the evolution of methyl mercaptan ceases. After cooling, the brassy-green crystals were removed and purified by boiling out with isopropyl alcohol. A yield of 4.1 grams of a product melting at 212–214° C. was obtained. The absorption maximum in methanol is 596 m$\mu$. The sensitization of an emulsion is extended to 700 m$\mu$ with a maximum at 650 m$\mu$.

*Example X*

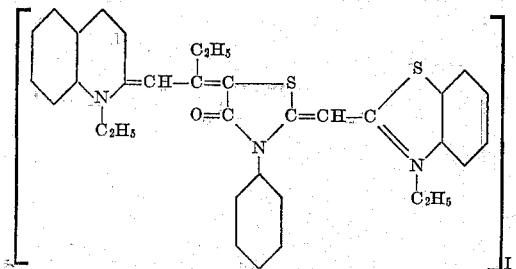

A mixture of 1 gram of the intermediate of Example III, 0.6 gram of quinaldine ethiodide, 50 cc. of methanol, and 1 cc. of triethylamine was heated at reflux for 15 minutes. The green dye crystals which separated on cooling were recrystallized from 25 cc. of methanol. A yield of 0.35 gram of a product melting at 230–231° C. was obtained. The absorption maximum of a methanol solution is 648 m$\mu$. When incorporated into a photographic emulsion the sensitivity is extended to 730 m$\mu$ with a maximum at 700 m$\mu$.

*Example XI*

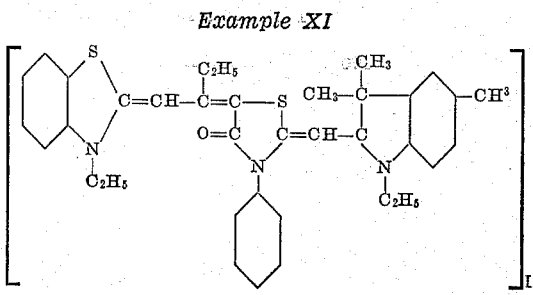

A mixture of 3 grams of the product of Example IV, 1 gram of 2-methylbenzothiazole ethiodide, 25 cc. of isopropyl alcohol, and 1 cc. of triethylamine was heated at reflux for 15 minutes. After the reaction mixture was diluted with several volumes of water, the dye separated as a semisolid and was purified by crystallization from 15 cc. of isopropyl alcohol. A yield of 0.3 gram of a final product was obtained. The absorption maximum of a methanol solution is 637 m$\mu$. When incorporated into a photographic emulsion the sensitization maximum is 690 m$\mu$.

*Example XII*

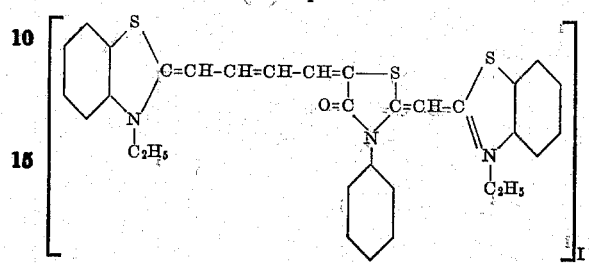

A mixture of 0.5 gram of 2-methylbenzothiazole ethiodide, 0.5 gram of the product of Example V, 20 cc. of methanol, and 0.5 cc. of triethylamine was boiled for 10 minutes. The dye which separated on cooling was recrystallized from methanol to yield the final product melting at 223° C. A solution of the dye in methanol showed an absorption maximum at 685 m$\mu$, and a sensitization maximum in a silver bromide emulsion at 740 m$\mu$.

*Example XIII*

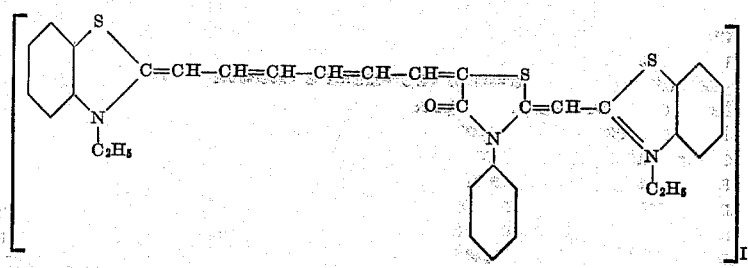

Example XII was repeated with the exception that 0.5 gram of the product of Example V was replaced by 0.5 gram of the product of Example VI. The methanol solution of the dye showed an absorption maximum at 822 m$\mu$, and a sensitization maximum in a silver bromide emulsion at 840 m$\mu$.

It is to be understood that the term "treating" as employed in the appended claims is used in a generic sense to include either the bringing together of the coreactants at room temperature, heating the coreactants to reflux, or warming or boiling the coreactants in a suitable solvent such as an aliphatic alcohol.

While I have disclosed the preferred embodiments of my invention and the preferred modes of carrying the same into effect, it will be readily apparent to those skilled in the art that many variations may be made therein without departing from the spirit thereof. Accordingly, the scope of my invention is to be limited solely by the appended claims.

I claim:

1. A process for the production of trinuclear cyanine dyestuffs which comprises treating in the presence of a basic condensing agent a cyclammonium quaternary salt containing a reactive methyl group in $\alpha$-position to the nitrogen atom thereof and of the type used in cyanine dyes with a thiazolone cyanine dye intermediate characterized by a formula selected from the class consisting of the following formulae:

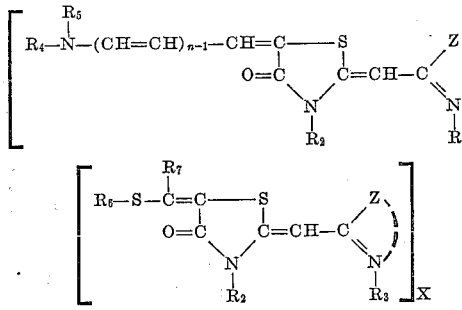

and

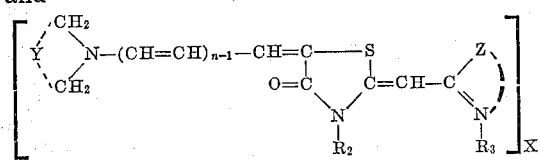

wherein R represents a member selected from the class consisting of hydrogen and alkyl groups, $R_2$ represents a member selected from the class consisting of alkyl, allyl, aryl, and aralkyl groups, $R_3$ represents a member selected from the class consisting of lower alkyl, lower hydroxyalkyl, lower alkoxyalkyl, aryl of the benzene and naphthalene series and aralkyl groups, $R_4$ represents an aryl group, $R_5$ represents a member selected from the class consisting of hydrogen and acetyl group, $R_6$ represents a member selected from the class consisting of alkyl and aralkyl groups, $R_7$ represents an alkyl group, $n$ represents a positive integer of from 1 to 3, X represents an acid radical, Y represents the atoms necessary to complete a saturated heterocyclic nitrogenous ring system selected from the class consisting of piperidine, β- and γ-pipecoline, pyrrolidine, morpholine, and tetrahydroquinoline; and Z represents the atoms necessary to complete a heterocyclic nitrogenous nucleus of the type used in cyanine dyes.

2. The process for the production of a trinuclear cyanine dyestuff characterized by the following formula:

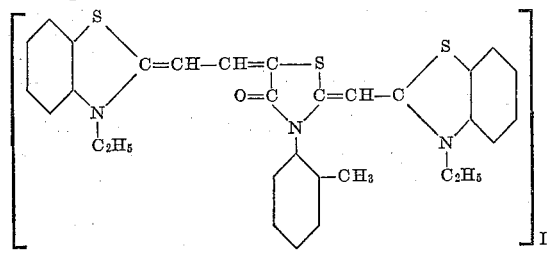

which comprises treating in the presence of a basic condensing agent a thiazolone cyanine dye intermediate of the formula:

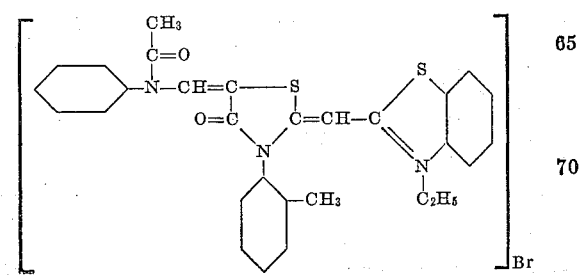

with 2-methylbenzothiazole ethiodide.

3. A process for the production of a trinuclear cyanine dyestuff characterized by the following formula:

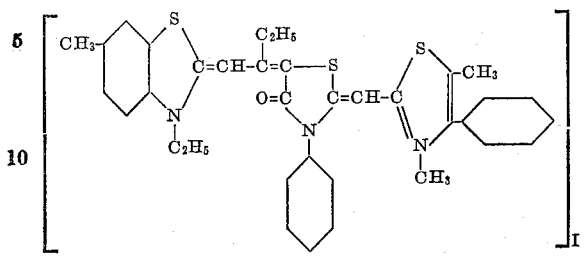

which comprises treating in the presence of a basic condensing agent a thiazolone cyanine dye intermediate of the formula:

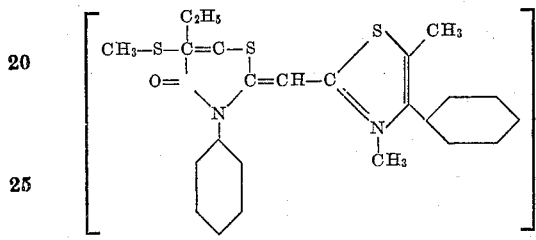

with 2-methyl-6-methoxybenzothiazole ethiodide.

4. A process for the production of a trinuclear cyanine dyestuff characterized by the following formula:

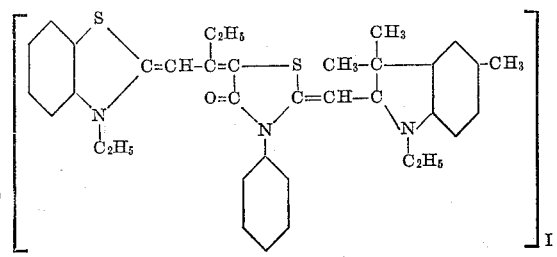

which comprises treating in the presence of a basic condensing agent a thiazolone cyanine dye intermediate of the formula:

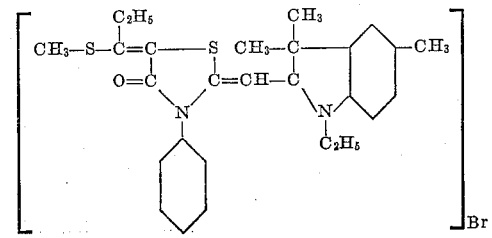

with 2-methylbenzothiazole ethiodide.

THOMAS R. THOMPSON.

No references cited.

Certificate of Correction

Patent No. 2,535,993 December 26, 1950

THOMAS R. THOMPSON

It is hereby certified that error appears in the printed specification of the above numbered patent requiring correction as follows:

Column 12, lines 18 to 27, inclusive, for the left-hand portion of the formula reading

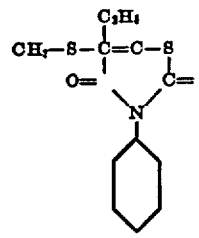 read 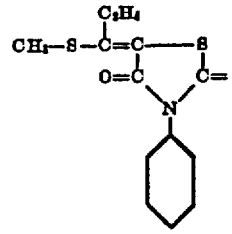

and that the said Letters Patent should be read as corrected above, so that the same may conform to the record of the case in the Patent Office.

Signed and sealed this 3rd day of April, A. D. 1951.

[SEAL]

THOMAS F. MURPHY,
*Assistant Commissioner of Patents.*